(12) United States Patent
Yu

(10) Patent No.: US 6,756,077 B2
(45) Date of Patent: Jun. 29, 2004

(54) WATER REPELLENT TEXTILE FINISHES AND METHOD OF MAKING

(75) Inventor: Hua Yu, White Plains, NY (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 10/077,986

(22) Filed: Feb. 20, 2002

(65) Prior Publication Data

US 2002/0161116 A1 Oct. 31, 2002

Related U.S. Application Data

(60) Provisional application No. 60/270,655, filed on Feb. 22, 2001.

(51) Int. Cl.$^7$ .................................................. B05D 3/02
(52) U.S. Cl. ...................... 427/387; 252/8.61; 252/8.62; 252/8.63; 525/477; 525/478; 524/837; 528/31
(58) Field of Search ................ 427/387; 252/8.61–8.62, 252/8.63; 524/837; 525/477, 478; 528/31, 17, 18, 34; 106/237.12, 237.16; 428/447

(56) References Cited

U.S. PATENT DOCUMENTS

| 4,252,933 A | * | 2/1981 | Sumida ........................ 528/33 |
| 4,891,398 A | | 1/1990 | Tanaka et al. |
| 5,232,611 A | | 8/1993 | Ohashi et al. ............... 252/8.6 |
| 5,395,549 A | | 3/1995 | Ozaki et al. |
| 5,409,620 A | | 4/1995 | Kosal et al. .................. 252/8.6 |
| 5,518,775 A | | 5/1996 | Kosal et al. ................. 427/387 |
| 5,567,347 A | | 10/1996 | Kosal et al. ............... 252/8.62 |
| 6,416,558 B1 | * | 7/2002 | Ona et al. .................. 8/115.51 |

FOREIGN PATENT DOCUMENTS

| EP | 0553840 A1 | 8/1993 |
| EP | 0764702 A2 | 3/1997 |
| GB | 1123447 | 8/1968 |
| JP | 50-10851 | 2/1975 |
| JP | 51-27465 | 3/1976 |

* cited by examiner

*Primary Examiner*—Philip Tucker
*Assistant Examiner*—Marc S Zimmer

(57) ABSTRACT

A composition that is preferably an aqueous emulsion is disclosed that comprises:

1) a compound of a defined formula comprising a silicon moiety and an epoxy functionality;
2) a compound of a defined formula comprising a silicon moiety and an alkoxy functionality;
3) a crosslinker of a defined formula comprising a silicon moiety; and
4) a catalyst.

Upon treating fibers or fabrics with the composition, a condensation reaction product is formed upon reaction with the catalyst at curing temperatures that imparts superior durability, water repellency, and softness to the fibers or fabrics.

8 Claims, 1 Drawing Sheet

WATER REPELLENT TEXTILE FINISHES AND METHOD OF MAKING

CROSS REFERENCE TO RELATED APPLICATIONS

We claim the benefit under Title 35, United States Code, § 120 of U.S. Provisional Application No. 60/270,655, filed Feb. 22, 2001, entitled WATER REPELLENT TEXTILE FINISHES AND METHOD OF MAKING.

BACKGROUND OF THE INVENTION

1. Field of the Invention

The present invention relates to a composition and its use for treating textile fibers and fabric substrates whereby desirable properties, such as water repellency and durability, are enhanced, while softness is imparted to the textile fibers or fabric substrates.

2. Description of Related Art

It is generally known to treat textile fibers with organopolysiloxanes to impart a variety of valuable properties to the fibers, such as water repellency, softness, lubricity, antipilling, good laundry and dry cleaning durability, and the like. The use of organopolysiloxanes to achieve such properties is well established, but there continues to be a need to improve these and other desirable properties of the fibers.

U.S. Pat. No. 5,232,611 discloses a fiber treatment agent characterized in that it comprises: (A) 100 parts by weight of an organopolysiloxane with no less than 2 hydroxyl groups and/or alkoxyl groups bonded to Si atoms per molecule, (B) 0.5–50 parts by weight of silica and/or a polysilsesquioxane, (C) 0.1–20 parts by weight of an organoalkoxysilane containing amide groups and carboxyl groups, and/or its partial hydrolysis condensate, (D) 0.1–20 parts by weight of an organoalkoxysilane containing amino groups or epoxy groups and/or its partial hydrolysis condensate, and (E) 0.01–10 parts by weight of a curing catalyst, and characterized in that it is also a cationic or non-ionic emulsion.

U.S. Pat. Nos. 5,409,620; 5,518,775; and 5,567,347 disclose fiber treatment compositions comprising an unsaturated acetate, an organohydrogensiloxane, a metal catalyst, an organosilicompound, and optionally a dispersant. The compositions are said to impart beneficial characteristics, such as slickness, softness, compression resistance and water repellency to substrates, such as fibers and fabrics.

Japanese Application No. 1973-62810 discloses compositions containing hydroxy-terminated poly(dimethylsiloxane) and reaction products of aminoalkoxysilane and epoxy-group containing alkoxysilane. The compositions are used as waterproofing agents for fabrics, paper, or leather. Thus, one mole of 3-(2-aminoethylamino) propyltrimethoxysilane and one mole of 3-glycidyloxypropyltrimethoxysilane were heated for three hours at 80–100°. The product (0.001 part) was added to 100 parts of a 1.5% solution of hydroxy-terminated poly(dimethylsiloxane). A polyester fabric was immersed in the solution, dried, and heated three minutes at 150° to give a fabric said to have water repellency (spray method) 100, softness 11.2 g, and good abrasion resistance, compared with 100, 29.9, and poor, respectively, for a similar fabric treated with poly(methylhydrogensiloxane) solutions containing metal compounds. Polyamide and cotton fabrics were similarly treated.

SUMMARY OF THE INVENTION

The present invention is directed to a composition comprising (1) a compound having an epoxy functionality, a compound having an alkoxy functionality, and a crosslinker, and (2) a catalyst, preferably as an aqueous emulsion. Upon treating fibers or fabrics with the composition of the present invention, a condensation reaction product is formed upon reaction with the catalyst at curing temperatures that imparts superior durability, water repellency, and softness to the fibers or fabrics.

More particularly, the present invention is directed to a composition comprising:

1) a compound of the formula:

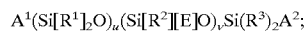

2) a compound of the formula:

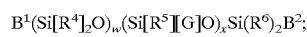

and 3) a crosslinker selected from the group consisting of:
   a) compounds of the formula:

b) compounds of the formula:

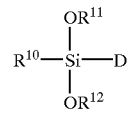

wherein $R^1$, $R^2$, $R^3$, $R^4$, $R^5$, $R^6$, $R^7$, $R^8$, and $R^9$ are independently selected from the group consisting of alkyl groups of from 1 to 4 carbon atoms;

E is a monovalent organic group comprising at least one epoxy group;

$A^1$ and $A^2$ are independently selected from the group consisting of alkyl groups of from 1 to 4 carbon atoms and monovalent organic groups comprising at least one epoxy group;

u is an integer from 1 to about 2000;

v is an integer from 0 to about 200;

the sum of u and v is from 1 to about 2200;

G is selected from the group consisting of hydroxy and alkoxy;

$B^1$ and $B^2$ are independently selected from the group consisting of alkyl groups of from 1 to 4 carbon atoms, hydroxy, and alkoxy;

w is an integer from 1 to about 1000;

x is an integer from 0 to about 50;

the sum of w and x is from 1 to about 1050;

$Z^1$ and $Z^2$ are independently selected from the group consisting of hydrogen and alkyl groups of from 1 to 4 carbon atoms;

y is from 1 to about 1000;

z is from 0 to about 2000;

the sum of y and z is from 1 to about 3000;

D is selected from the group consisting of hydrogen, substituted or unsubstituted $C_1$–$C_{12}$ hydrocarbon moieties, $OR^{14}$, and moieties of the formula:

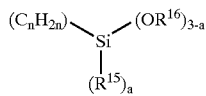

$R^{10}$ and $R^{15}$ are independently selected from the group consisting of hydrogen, substituted or unsubstituted $C_1$–$C_{12}$ hydrocarbon moieties, and $OR^{13}$;

$R^{11}$, $R^{12}$, $R^{13}$, $R^{14}$, and $R^{16}$ are independently selected from the group consisting of $C_1$–$C_6$ hydrocarbon moieties;

n is 1, 2, or 3; and a is 0, 1, or 2.

Preferably, the composition is in the form of an aqueous emulsion.

In another aspect, the present invention is directed to a process of treating textiles comprising the steps of:

A) providing an aqueous emulsion comprising a composition comprising:

1) a compound of the formula:

2) a compound of the formula:

3) a crosslinker selected from the group consisting of:
a) compounds of the formula:

and
b) compounds of the formula:

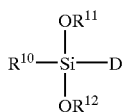

wherein $R^1$, $R^2$, $R^3$, $R^4$, $R^5$, $R^6$, $R^7$, $R^8$, and $R^9$ are independently selected from the group consisting of alkyl groups of from 1 to 4 carbon atoms;

E is a monovalent organic group comprising at least one epoxy group;

$A^1$ and $A^2$ are independently selected from the group consisting of alkyl groups of from 1 to 4 carbon atoms and monovalent organic groups comprising at least one epoxy group;

u is an integer from 1 to about 2000;

v is an integer from 0 to about 2000;

the sum of u and v is from 1 to about 2200;

G is selected from the group consisting of hydroxy and alkoxy;

$B^1$ and $B^2$ are independently selected from the group consisting of alkyl groups of from 1 to 4 carbon atoms, hydroxy, and alkoxy;

w is an integer from 1 to about 1000;

x is an integer from 0 to about 50;

the sum of w and x is from 1 to about 1050;

$Z^1$ and $Z^2$ are independently selected from the group consisting of hydrogen and alkyl groups of from 1 to 4 carbon atoms;

y is from 1 to about 1000;

z is from 0 to about 2000;

the sum of y and z is from 1 to about 3000;

D is selected from the group consisting of hydrogen, substituted or unsubstituted $C_1$–$C_{12}$ hydrocarbon moieties, $OR^{14}$, and moieties of the formula:

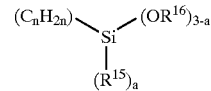

$R^{10}$ and $R^{15}$ are independently selected from the group consisting of hydrogen, substituted or unsubstituted $C_1$–$C_{12}$ hydrocarbon moieties, and $OR^{13}$;

$R^{11}$, $R^{12}$, $R^{13}$, $R^{14}$, and $R^{16}$ are independently selected from the group consisting of $C_1$–$C_6$ hydrocarbon moieties;

n is 1, 2, or 3; and a is 0, 1, or 2.

B) providing a catalyst suitable to the aqueous emulsion that will promote a condensation reaction between compounds 1), 2), and 3);

C) mixing the aqueous emulsion and the catalyst to form a mixture;

D) applying the mixture to the textile; and

E) heat treating the textile to form a condensation reaction product of compounds of 1), 2), and 3);

whereby the textile has enhanced durability, water repellency, and softness.

As employed herein, the term "textile" is intended to include within its scope both textile fibers and textile fabrics.

DESCRIPTION OF THE PREFERRED EMBODIMENTS

Figure 1:
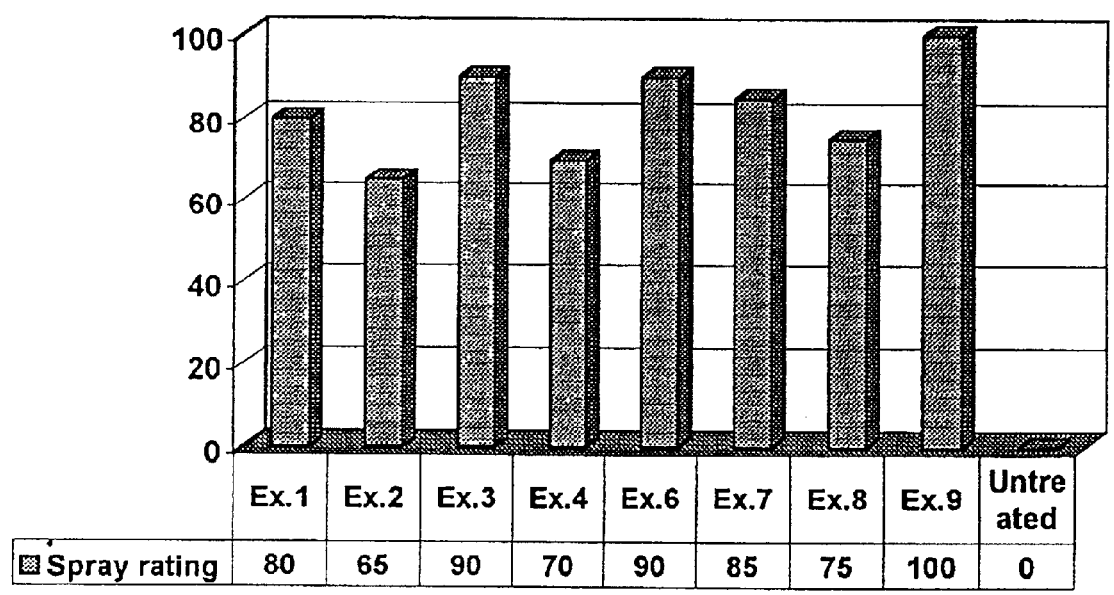
FIG. 1 is a bar graph showing the AATCC spray ratings of water repellant finishes on 100% cotton twill fabric with an add-on of 1.5% silicone, based on the weight of the fabric. The processing conditions were 105° C. for five minutes for drying and 165° C. for five minutes for curing.

The compositions employed in the practice of the present invention comprise:

1) a compound of the formula:

2) a compound of the formula:

and 3) a crosslinker selected from the group consisting of:
a) compounds of the formula:

and
b) compounds of the formula:

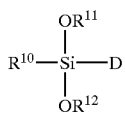

wherein
$R^1$, $R^2$, $R^3$, $R^4$, $R^5$, $R^6$, $R^7$, $R^8$, and $R^9$ are independently selected from the group consisting of alkyl groups of from 1 to 4 carbon atoms;
E is a monovalent organic group comprising at least one epoxy group;
$A^1$ and $A^2$ are independently selected from the group consisting of alkyl groups of from 1 to 4 carbon atoms and monovalent organic groups comprising at least one epoxy group;
u is an integer from 1 to about 2000;
v is an integer from 0 to about 200;
the sum of u and v is from 1 to about 2200;
G is selected from the group consisting of hydroxy and alkoxy;
$B^1$ and $B^2$ are independently selected from the group consisting of alkyl groups of from 1 to 4 carbon atoms, hydroxy, and alkoxy;
w is an integer from 1 to about 1000;
x is an integer from 0 to about 50;
the sum of w and x is from 1 to about 1050;
$Z^1$ and $Z^2$ are independently selected from the group consisting of hydrogen and alkyl groups of from 1 to 4 carbon atoms;
y is from 1 to about 1000;
z is from 0 to about 2000;
the sum of y and z is from 1 to about 3000;
D is selected from the group consisting of hydrogen, substituted or unsubstituted $C_1$–$C_{12}$ hydrocarbon moieties, $OR^{14}$, and moieties of the formula:

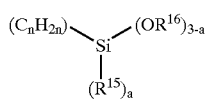

$R^{10}$ and $R^{15}$ are independently selected from the group consisting of hydrogen, substituted or unsubstituted $C_1$–$C_{12}$ hydrocarbon moieties, and $OR^{13}$;
$R^{11}$, $R^{12}$, $R^{13}$, $R^{14}$, and $R^{16}$ are independently selected from the group consisting of $C_1$–$C_6$ hydrocarbon moieties;
n is 1, 2, or 3; and
a is 0, 1, or 2.

A condensation reaction product is formed that will impart the desired properties to the textile when the compounds having the particular functionalities and the crosslinker are reacted with the catalyst and cured. Additional components can be added to the compounds and crosslinker which can comprise other polysiloxanes with or without the specified functionalities.

Aqueous emulsions formed from the foregoing composition and a catalyst, when applied to natural or synthetic textile fibers and fabric substrates, provide excellent levels of water repellency, softness and durability.

It is preferred that compounds 1), 2), and 3) have molecular weights of about 100 to about 200,000, and more preferred, about 1000 to 100,000.

In the above-described structural formulae, $R^1$, $R^2$, $R^3$, $R^4$, $R^5$, $R^6$, $R^7$, $R^8$, and $R^9$ are independently selected from the group consisting of alkyl groups of from 1 to 4 carbon atoms, i.e., methyl, ethyl, n-propyl, isopropyl, n-butyl, isobutyl, sec-butyl, and tert-butyl. Preferably, $R^1$, $R^2$, $R^3$, $R^4$, $R^5$, $R^6$, $R^7$, $R^8$, and $R^9$ are all the same, more preferably all are methyl.

E is a monovalent organic group comprising at least one epoxy group. Preferably, E is selected from the group consisting of moieties of the structural formulae:

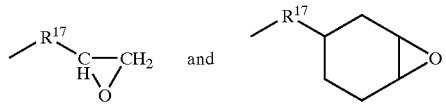

wherein $R^{17}$ is a divalent substituted or unsubstituted organic group, such as methylene, ethylene, propylene, phenylene, chloroethylene, flouroethylene, $-CH_2OCH_2CH_2CH_2-$, $-CH_2CH_2OCH_2CH_2-$, $-CH_2OCH_2CH_2(CH_3)OCH_2CH_2-$, or $-CH_2CH_2OCH_2CH_2-$.

$A^1$ and $A^2$ are independently selected from the group consisting of alkyl groups of from 1 to 4 carbon atoms, i.e., methyl, ethyl, n-propyl, isopropyl, n-butyl, isobutyl, sec-butyl, and tert-butyl, and monovalent organic groups comprising at least one epoxy group, preferably of the kind described for E above.

Values for u preferably range from about 10 to about 1000 and values for v preferably range from about 1 to about 20.

G is either hydroxy or alkoxy. Where G is alkoxy, it is preferably alkoxy of from one to four carbon atoms, e.g., methoxy, ethoxy, propoxy, butoxy, and isomers thereof.

$B^1$ and $B^2$ are independently selected from the group consisting of alkyl groups of from 1 to 4 carbon atoms, i.e., methyl, ethyl, n-propyl, isopropyl, n-butyl, isobutyl, sec-butyl, and tert-butyl, hydroxy, and alkoxy. Where $B^1$ and/or $B^2$ are alkoxy, it is preferably an alkoxy of from one to four carbon atoms, e.g., methoxy, ethoxy, propoxy, butoxy, and isomers thereof.

Values for w preferably range from about 20 to about 500 and values for x preferably range from zero to about 10.

$X^1$ and $X^2$ are independently selected from the group consisting of hydrogen and alkyl groups of from 1 to 4 carbon atoms, i.e., methyl, ethyl, n-propyl, isopropyl, n-butyl, isobutyl, sec-butyl, and tert-butyl.

Values for y preferably range from about 1 to about 100 and values for z preferably range from about 10 to about 500.

Compound 1) is advantageously present in the aqueous emulsion in a range of from about 1 to about 95 wt. %, preferably from about 10 to about 60 wt. % based on the total weight of the compounds 1), 2), and 3).

Compound 2) is advantageously present in the aqueous emulsion in a range of from about 1 to about 95 wt. %, and preferably, from about 5 to about 50 wt. % based on the total weight of the compounds 1), 2), and 3).

Compound 3)a) is advantageously present in the aqueous emulsion in a range of from about 1 to about 60 wt. % and preferably from about 1 to about 40 wt. % based on the total weight of the compounds 1), 2), and 3).

Compound 3)b) is advantageously present in the aqueous emulsion in a range of from about 0.1 to about 40 wt. % and preferably from about 0.1 to about 20 wt. % based on the total weight of the compounds 1), 2), and 3).

When the compositions of the present invention are used as textile coatings, a catalyst is preferably present. Suitable catalysts include acid catalysts. Examples of such acid catalysts include, but are not limited to, the metal salts of acids, such as zinc nitrate, aluminum sulfate, zirconium acetate or zinc sulfate, and metal halides. Other catalysts include zinc chloride, magnesium chloride, and aluminum chloride. Metal soaps, such as zinc-2-ethylhexanoate, dibutyltin dilaurate, and dibutyltin diacetate; non-polymeric anhydrides, such as tetrapropenyl succinic anhydride; and butyl acid phosphate are also contemplated as suitable catalysts in the practice of the present invention.

The catalyst is employed in the textile coating emulsions of the present invention in a range of from about 0.1 to about 30 wt. %, and preferably from about 0.1 to about 20 wt. %, based on a total weight of the compounds 1), 2), and 3). Preferably, the catalyst is provided in a separate aqueous emulsion.

Where compound 3) is of the structure

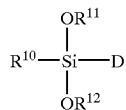

it is preferred that the silane contain at least three alkoxy groups in order to provide a suitable crosslinkable silicone intermediate.

Examples of such silanes include, but are not necessarily limited to, methyltrimethoxysilane, methyltriethoxysilane, ethyltriethoxysilane, methylpentamethoxydisilylethane, tetraethoxysilane, cyclohexyltriethoxysilane and methyltripropoxysilane.

An aqueous emulsion of the composition of the present invention can be prepared by high shear mixing or agitation to give a good mixture of of water with compounds 1), 2), and 3). Surface active agents, so-called emulsifiers, known in the art, can also be added to the aqueous emulsion.

The surface active agents used in the preparation of the aqueous emulsion include, but are not limited to, 1) non-ionic surface active agents, such as polyoxyethylene alkyl ethers, polyoxyethylene alkylphenyl ethers, sorbitan fatty acid esters, glycerine fatty acid esters, and the like;
2) anionic surface active agents, such as sodium lauryl sulfate, sodium dodecylbenzene sulfonate, sodium polyoxyethylene ether carboxylate, and the like; and
3) cationic surface active agents, such as quaternary ammonium salts and the like.

In order to obtain a stable aqueous emulsion of the compounds 1), 2), and 3), it is preferable that at least 50 wt. % of the total amount of the surface active agent is non-ionic or a combination of non-ionic surface active agents, of which the overall HLB value is in the range of from 6 to 14 as a weight-average. However, the above mentioned surface active agents can be used either singly or as a combination of two or more kinds, as determined by one skilled in the art.

The amount of the surface active agents used in the preparation of the aqueous emulsion should be in the range from about 5 to about 100 parts by weight, preferably from about 5 to about 50 parts by weight, per 100 parts by weight of the total amount of the components.

The amount of water used in the preparation of aqueous emulsions of compounds 1), 2), and 3) should be adequate to give either an oil-in-water emulsion or a water-in-oil emulsion having good stability. In this regard, the amount of water should be in the range of from about 20 to about 2000 parts by weight, preferably from about 100 to about 500 parts by weight, per 100 parts by weight of the total amount of the compounds 1), 2), and 3).

The aqueous emulsions can be prepared by merely mixing and agitating the compounds disclosed above with a stirrer, such as a homomixer or homogenizer. Compounds 1), 2), and 3), surface active agent(s), and water can be introduced together into a vessel in a specific amount, or as a premixture of compounds 1), 2), and 3) and surface active agent(s) followed by the addition of water. Thus, an aqueous emulsion of compounds 1), 2), and 3), and surface active agent(s) of the oil-in-water or water-in-oil type are easily obtained to provide the desired performance as a fiber/fabric finishing agent. The length of time for agitation depends upon the balance of the interfacial properties between the compounds, the surface active agents, and water. Commercially available agitation apparatus are readily available for this purpose.

The aqueous emulsions of the present invention prepared as described above have excellent stability in storage, upon dilution, and when subjected to mechanical shearing force. They can be diluted with water to a desired active level and applied onto a fiber or fabric textile by spraying, dipping, padding, kiss roll, and the like. Removal of any excess emulsion can be achieved by using a mangle, centrifugal separator, or the like to control the amount of liquid absorbed by the textile. Drying can be effected with or without heat. Depending upon the particular textile being treated, when drying is performed with heat, the temperature is usually in the range from about 70° C. to about 180° C., and the time of heating from about 1 to about 30 minutes. After removal of excessive emulsion, subsequent heating to promote curing is normally required. Effective cure temperatures are in the range from about 120° C. to about 200° C. for about 1 to about 30 minutes. Upon curing, the resultant condensation product imparts durability, water repellency, and softness to the textile.

The amount of the aqueous emulsion that a textile absorbs is usually in the range of from about 0.1 to about 5 wt. %, calculated by the total amount of compounds 1), 2), and 3). It may be desirable to prepare an emulsion having a higher polymer content in order to reduce shipping and/or handling costs and then to dilute the emulsion with water immediately prior to use. The polymer content of the aqueous emulsions of the present invention typically ranges from about 10 to about 80 wt. %, preferably, about 20 to about 40 wt. %, based on the total weight of the aqueous emulsion.

Other additives typically employed in treating textiles can be included in the emulsions or applied separately to the textiles. Such additives can include, for example, durable press resins, curing catalysts, preservatives or biocides, water soluble pigments or dyes, fragrances, fillers, pH adjusters, and antifoamers or defoamers.

The aqueous emulsions comprising compounds 1), 2), and 3) and a catalyst are useful as finishing treatments for fabrics having various types of fibers, including natural fibers, synthetic fibers, and blends thereof For example, excellent water repellency is imparted to the textiles comprising synthetic fibers, such as polyester, acrylic, nylon, aramid, and the like, as well as to textiles comprising various kinds of natural fibers, such as cotton, silk, and wool, by applying the aqueous emulsions of the present invention. Materials that can be treated include filaments, rovings, threads, woven and non-woven fabrics, knit cloths, and the like. Furthermore, the compositions of the present invention can also be applied to inorganic fibers, such as glass fibers and carbon fibers.

The advantages and the important features of the present invention will be more apparent from the following examples.

EXAMPLES

Tests

Water Repellency
(AATCC Test Method 22-1996, Water Repellency: Spray Test)

The evaluation of water repellency of textile fabric was performed according to the cited AATCC standard Spray Test method.

A spray rating of 100 means no sticking or wetting of the upper surface (best water repellency).
A spray rating of 90 means slightly random sticking or wetting of the upper surface.
A spray rating of 80 means wetting of upper surface at spray point.
A spray rating of 70 means partial wetting of whole of upper surface
A spray rating of 50 means complete wetting of whole upper surface.
A spray rating of 0 means complete wetting of whole upper surface and lower surfaces.

Water Repellency Durability Test

The durability of water repellency of textile fabric was evaluated by measuring the water repellency of the textile fabric after being washed according to the AATCC Guideline for Standardization of Home Laundry Test Conditions (AATCC Technical Manual p. 362). Better durability of water repellency is interpreted by the higher of the spray rating with higher wash cycles.

In the descriptions of the following compositions, as well as the tables, all measurements relating to the individual constituents are listed in units of grams unless indicated otherwise.

Example 1

Premix 25 grams of epoxy polysiloxane with viscosity of 6000 cPs and epoxy content of 1 wt % ($C_2O$), 3.4 grams of Tergitol® 15-S-3 and 2.9 grams of Tergitol® 15-S-15 in a 100 ml plastic mixing vessel at moderate speed (~400 rpm) for 15 minutes. Stir at a speed high enough (~600 rpm) to generate a small vortex and, within each 10 minute interval, slowly add 10 grams of water, 4 grams of water, 10 grams of water, and the final premix of 44.4 grams of water/0.3 gram of propylene glycol/0.05 gram of sodium bicarbonate. Add the water at a rate such that the mix is able to absorb it. Mix for an additional 10–15 minutes. This should result in a milky and stable emulsion, with a viscosity of 20–300 cPs that is stable at 55° C. (130° F.) for more than one day. Add 10 grams of phosphoric acid (1% water solution) to the emulsion before application to the fabric.

Example 2

Premix 35 grams of silanols with viscosity of 100 cPs and hydroxyl content of 1.5% (OH), 1 gram of Tergitol TMN-6, and 1 gram of Tergitol NP-40 in a 100 ml plastic mixing vessel at moderate speed (~400 rpm) for 15 minutes. Stir at a speed high enough (~600 rpm) to generate a small vortex and slowly add 16 grams of water. Add the water at a rate such that the mix is able to absorb it. Mix for an additional 10–15 minutes. Slowly add a final 47 grams of water to the mixture and mix for additional 10–15 minutes. This should result in a milky and stable emulsion with a viscosity of 20–300 cPs that is stable at 55° C. (130° F.) for more than one day.

Example 3

Premix 40 grams of silanic hydrogen fluid with a viscosity of 30 cPs and SiH content of 350 cc $H_2$/g, 1 gram of Tergitol TMN-6 and 0.6 gram of Tergitol 15-S-20 in a 100 ml plastic mixing vessel at moderate speed (~400 rpm) for 15 minutes. Stir at a speed high enough (~600 rpm) to generate a small vortex and slowly add 58.2 grams of water. Add the water at a rate such that the mix is able to absorb it. Mix for an additional 10–15 minutes. This should result in a milky and stable emulsion with a viscosity of 20–300 cPs that is stable at 55° C. (130° F.) for more than one day.

Example 4

Premix 35 grams of aminopolysiloxane with a viscosity of 3500 cPs and an amino content of 0.2 wt % ($NH_2$), 2 grams of Trycol® 5993A and 4 grams of Tergitol 15-S-15 in a 100 ml plastic mixing vessel at moderate speed (~400 rpm) for 5 minutes. Stir at a speed high enough (~600 rpm) to generate a small vortex, and at 10 minute intervals, slowly add 3 grams of water, 6 grams of water, and a final 51 grams of water. Add the water at a rate such that the mix is able to absorb it. Mix for an additional 10–15 minutes. This should result in a milky and stable emulsion with a viscosity of 20–300 cPs that is stable at 55° C. (130° F.) for more than one day.

Example 5

Premix 3.1 grams of Tween® 80, 0.8 gram of Atmos® 300 and 2 g of water in a 100 ml plastic mixing vessel at moderate speed (~400 rpm) for 15 minutes. Stir at a speed high enough (~600 rpm) to generate a small vortex and slowly add 39 grams of zinc octoate (18% Zn) and mix for additional 15 minutes. Slowly add a final 57.1 grams of water to the mixture. Add the water at a rate such that the mix is able to absorb it and mix for additional 10–15 minutes. This should result in a milky and stable emulsion with a viscosity of 20–300 cPs.

Example 6

Mix 78 grams of the product of Example 2, 10 grams of the product of Example 3, and 12 grams of the product of Example 5 in a 200 ml plastic mixing vessel at moderate speed (~400 rpm) for 15 minutes. This should result in a milky and stable emulsion with a viscosity of 20–300 cPs.

Example 7

Mix 80 grams of the product of Example 1, 10 grams of the product of Example 3, and 10 grams of phosphoric acid (1% water solution) in a 200 ml plastic mixing vessel at moderate speed (~400 rpm) for 15 minutes. This should result in a milky and stable emulsion with a viscosity of 20–300 cPs.

Example 8

Mix 45 grams of the product of Example 1, 45 grams of the product of Example 2, and 10 grams of the product of Example 5 in a 200 ml plastic mixing vessel at moderate speed (~400 rpm) for 15 minutes. This should result in a milky and stable emulsion with a viscosity of 20–300 cPs.

Example 9

Mix 13 grams of the product of Example 1, 14 grams of the product of Example 2, 2 grams of the product of Example 3, and 2 grams of the product of Example 5 in a 100 ml plastic mixing vessel at moderate speed (~400 rpm) for 15 minutes. This should result in a milky and stable emulsion with a viscosity of 20–300 cPs.

Example 10

Aqueous emulsions of the organopolysiloxanes in Examples 1–4 and 6–9 were applied to 100% cotton twill cloth by pad/dry process. The drying conditions were 105° C./5 minutes and the cure conditions were 165° C./5 minutes. The silicone solid contents based on the fabric weight (BOWF) were controlled at 1.5 wt %. The water repellency evaluation was based on the test methods described above. These results are shown in FIG. 1.

The new organopolysiloxane emulsions with epoxysilicones, silanols, and silanic hydrogen fluids (Example 9) provided an initial spray rating of 100 before washing, which was the best water repellency results among all the emulsions tested.

Example 11

Aqueous emulsions of the organopolysiloxanes in Examples 1, 4, and 9 were applied to 100% cotton twill cloth by pad/dry process. The drying conditions were 105° C./5 minutes and the cure conditions were 165° C./5 minutes. The silicone solid contents based on the fabric weight were controlled as 1.0 wt %, 1.5 wt %, and 2 wt %, respectively. The water repellency and durability evaluations were based on the test methods described above. These results are shown in Table 1.

The water repellency results of treated 100% cotton twill fabric with the product of Example 9 provided much better durability by washings than those of Example 1 and Example 4.

TABLE 1

AATCC Spray Rating Test Results on 100% Cotton Twill fabric with Water Repellent Finish[(1)]

| | Number of Washes (AATCC Standard) | | | | | | | | | | | |
|---|---|---|---|---|---|---|---|---|---|---|---|---|
| | 0 | | | 5 | | | 10 | | | 20 | | |
| % Add-on (BOWF)[(2)] | Ex. 9 | Ex. 1 | Ex. 4 | Ex. 9 | Ex. 1 | Ex. 4 | Ex. 9 | Ex. 1 | Ex. 4 | Ex. 9 | Ex. 1 | Ex. 4 |
| 1 | 95 | 75 | 65 | 80 | 50 | 50 | 70 | 0 | 0 | 70 | 0 | 0 |
| 1.5 | 100 | 80 | 70 | 85 | 65 | 50 | 85 | 50 | 0 | 80 | 0 | 0 |
| 2 | 95 | 85 | 75 | 85 | 75 | 50 | 85 | 50 | 50 | 85 | 0 | 0 |

[(1)]Processing Condition: 105° C./5 min for drying and 165° C./5 min for curing.
[(2)]BOWF: based on weight of fabric.

In view of the many changes and modifications that can be made without departing from principles underlying the invention, reference should be made to the appended claims for an understanding of the scope of the protection to be afforded the invention.

What is claimed is:

1. A process of treating textiles comprising the steps of:
A) providing an aqueous emulsion comprising a composition comprising:
1) an aqueous emulsion of a compound of the formula:

2) an aqueous emulsion of a compound of the formula:

3) an aqueous emulsion of a crosslinker of the formula:

wherein
$R^1$, $R^2$, $R^3$, $R^4$, $R^5$, $R^6$, $R^7$, $R^8$, and $R^9$ are independently selected from the group consisting of alkyl groups of from 1 to 4 carbon atoms;
E is a monovalent organic group comprising at least one epoxy group;
$A^1$ and $A^2$ are independently selected from the group consisting of alkyl groups of from 1 to 4 carbon atoms and monovalent organic groups comprising at least one epoxy group;
u is an integer from 1 to about 2000;
v is an integer from 0 to about 200;
the sum of u and v is from 1 to about 2200;
G is selected from the group consisting of hydroxy and alkoxy;
$B^1$ and $B^2$ are independently selected from the group consisting of alkyl groups of from 1 to 4 carbon atoms, hydroxy, and alkoxy;
w is an integer from 1 to about 1000;
x is an integer from 0 to about 50;
the sum of w and x is from 1 to about 1050;
$Z^1$ and $Z^2$ are independently selected from the group consisting of hydrogen and alkyl groups of from 1 to 4 carbon atoms;
y is from 1 to about 1000;
z is from 0 to about 2000;
the sum of y and z is from 1 to about 3000;
provided that component 1) comprises at least one epoxy moiety, component 2) comprises at least one alkoxy- or silanol moiety, and component 3) comprises at least two silicon bound hydrogen groups;
B) providing a catalyst suitable to the aqueous emulsion that will promote a condensation reaction between compounds 1), 2), and 3),
C) mixing the aqueous emulsion and the catalyst to form a mixture;
D) applying the mixture to the textile; and
E) heat treating the textile to form a condensation reaction product of compounds of 1), 2), and 3),
whereby the textile has enhanced durability, water repellency, and softness.

2. The process of claims 1 further comprising the step of removing an excess of the aqueous emulsion from the textile.

3. The process of claim 1 wherein the aqueous emulsion further comprises at least one non-ionic surface active agent.

4. The process of claim 1 wherein the catalyst is selected from the group consisting of metal salts of acids, zinc chloride, magnesium chloride, aluminum chloride, metal soaps, non-polymeric anhydrides, and butyl acid phosphate.

5. The process of claim 3 wherein the non-ionic surface active agent comprises at least 50% by weight of all surface active agents present.

6. The process of claim 1 wherein $R^1$, $R^2$, $R^3$, $R^4$, $R^5$, $R^6$, $R^7$, $R^8$, and $R^9$ are all the same.

7. The process of claim 6 wherein $R^1$, $R^2$, $R^3$, $R^4$, $R^5$, $R^6$, $R^7$, $R^8$, and $R^9$ are all methyl.

8. The process of claim 1 wherein E is selected from the group consisting of moieties of the structural formulae:

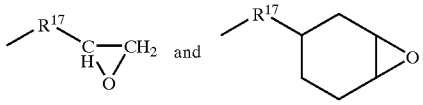

wherein $R^{17}$ is a divalent substituted or unsubstituted organic group.

* * * * *